(12) United States Patent
Sakurai

(10) Patent No.: US 6,352,221 B1
(45) Date of Patent: Mar. 5, 2002

(54) ROTARY LANDING GEAR ASSEMBLY

(75) Inventor: Seiya Sakurai, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/519,017

(22) Filed: Mar. 3, 2000

(51) Int. Cl.[7] .............................................. B64C 25/10
(52) U.S. Cl. ................. 244/102 R; 244/129.4
(58) Field of Search .................. 244/100 R, 102 R, 244/102, 129.5, 129.4

(56) References Cited

U.S. PATENT DOCUMENTS

| 2,378,856 A | 6/1945 | Laddon et al. |
| 2,445,131 A | 7/1948 | Wartian |
| 2,457,625 A | * 12/1948 | Amiot ..................... 244/129.5 |
| 2,604,281 A | 7/1952 | Buchal et al. |
| 2,658,792 A | 11/1953 | Scott |
| 2,670,156 A | 2/1954 | Clark et al. |
| 2,731,221 A | 1/1956 | Holton |
| 2,921,501 A | 1/1960 | Parot |
| 3,174,712 A | 3/1965 | Ricard |
| 3,486,721 A | 12/1969 | Myczinski |
| 3,506,223 A | 4/1970 | Flemming |
| 3,585,757 A | 6/1971 | Ritchie et al. |
| 3,718,171 A | 2/1973 | Godwin |
| 5,181,677 A | 1/1993 | Kaplan et al. |

* cited by examiner

*Primary Examiner*—Charles T. Jordan
*Assistant Examiner*—Tim D. Collins
(74) *Attorney, Agent, or Firm*—Robert B. Hughes; Hughes Law Firm, PLLC

(57) ABSTRACT

A landing gear door assembly for an aircraft, having a closed position to cover the door opening through which the landing gear moves between its stowed and operating position. The door assembly comprises two panel sections, each of which is rotated by a related positioning section so as to rotate about a center of rotation from the closed positions upwardly and outwardly into the aircraft structure to the open position. In one arrangement, each panel section is made up of an inside and outside panel which are hinge mounted with respect to one another. These move in a manner that the outer panel moves in a path deviating from a straight rotational path to provide better clearance with the aircraft structure. In another arrangement, each panel section is rigid and is rotated about a fixed axis of rotation.

23 Claims, 6 Drawing Sheets

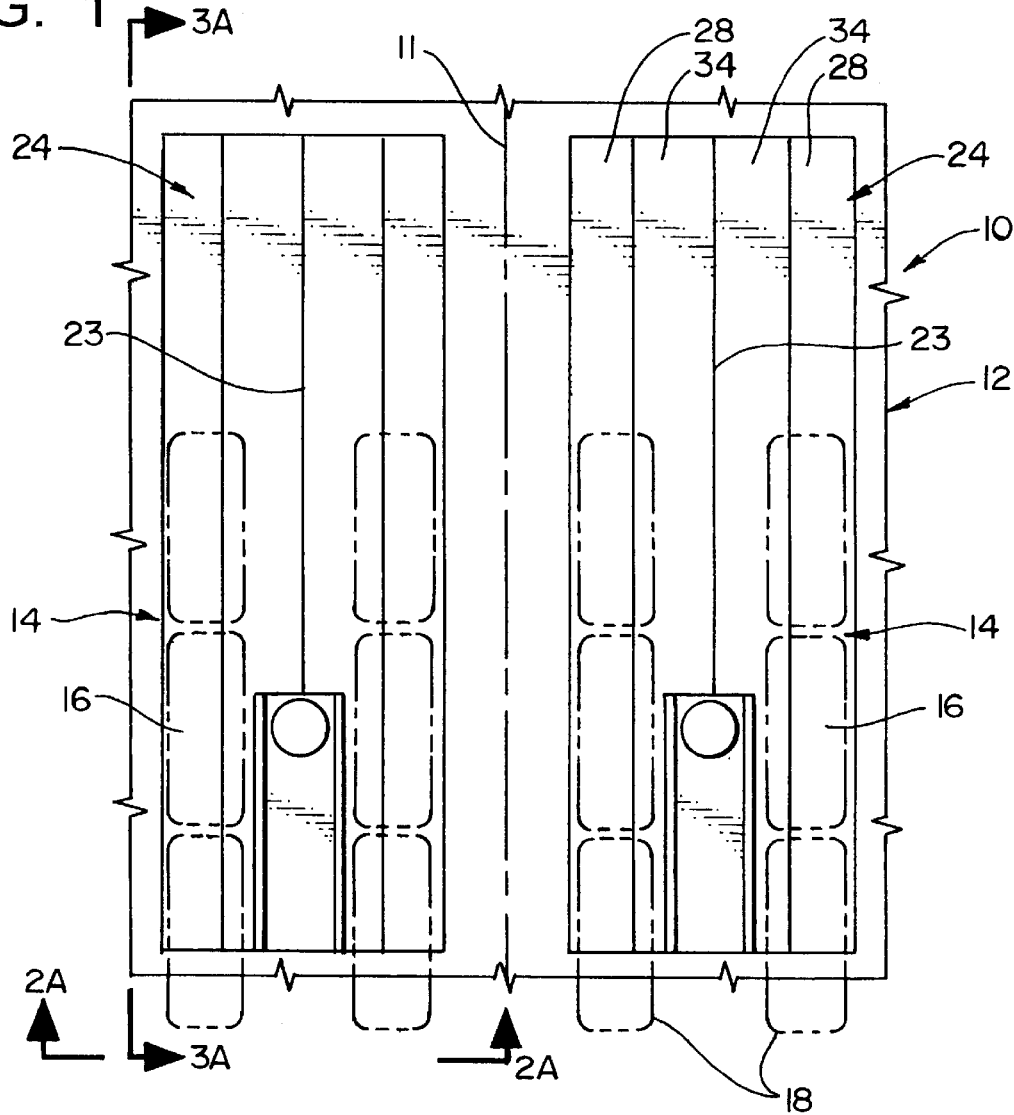

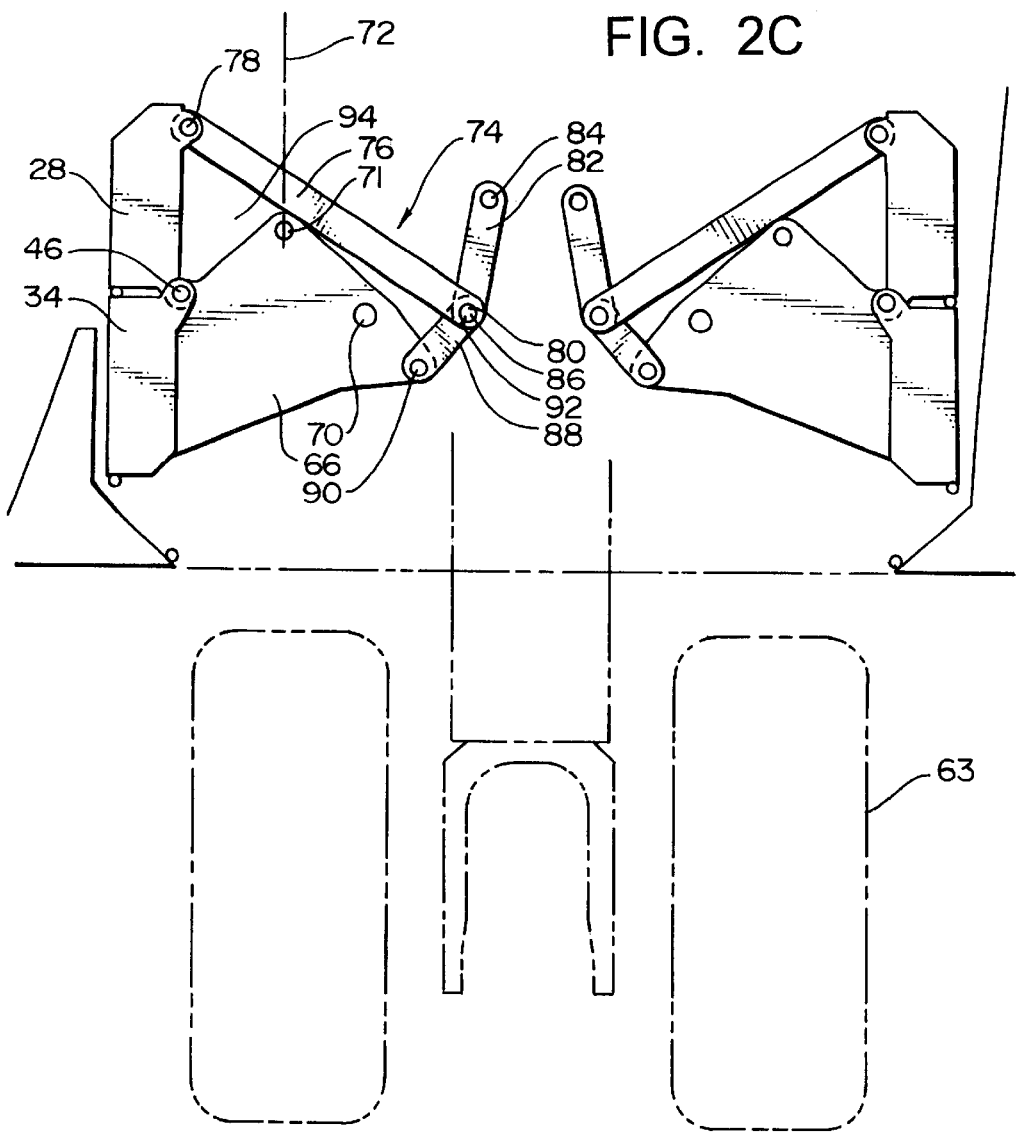

ROTARY LANDING GEAR ASSEMBLY

BACKGROUND OF THE INVENTION a) Field of the Invention

The present invention relates to aircraft landing gear, and more particularly to such a landing gear which is particularly adapted to be used with larger aircraft and provide proper ground clearance and also clearance for inspection and maintenance of the landing gear.

b) Background Art

Airplanes commonly have retractable landing gear, where the landing gear has a stowed position within the airplane structure, and an operating position where the landing gear extends from the airplane structure so that the landing gear wheels can properly engage the ground surface. Accordingly, the fuselage of the airplane (or other body carrying the landing gear) is provided with landing gear well doors which remain closed during flight, but are opened before landing to permit the landing gear to be moved to its operating position for ground engagement upon landing of the airplane.

Proper utilization of space is, of course, very important for most all aircraft. Also, it is necessary to provide the various components of the airplane with proper access and clearance for maintenance, repair, etc. With landing gear, for example, it is desirable that when the airplane is on the ground, the landing gear doors and other components are positioned to provide proper clearance to facilitate wheel inspection and maintenance. Also there are minimum clearance requirements on both sides of the body to accommodate wheel change and supporting equipment.

A search of the patent literature has disclosed a number of devices related generally to aircraft or other transportation vehicles, showing various doors and other closure mechanisms for a variety of purposes. These are the following:

U.S. Pat. No. 2,378,856 (Laddon et al.) illustrates a "sliding closure for aircraft". In FIG. 1, there are shown the closure doors 24 which are flexible and move in tracks from a lower position (on the left side of FIG. 1) to an upper position (right side of FIG. 1). This could be used, for example, for providing a bottom opening for the discharge of bombs. FIG. 4 shows another embodiment where this could be used as a sliding enclosure for a tail gun compartment or "any other access opening".

U.S. Pat. No. 2,445,131 shows a door mounting system for an aircraft where the door moves a short distance laterally in the channels 13–16. When the door is moved to the position in FIG. 3, the several rollers 26 become aligned with an upper channel 35 and the lower channel 36 and then the doors slip laterally to the position of the FIG. 5 to its open position.

U.S. Pat. No. 2,604,281 (McCall et al.) discloses a door structure for a bomb bays in the military aircraft. In FIG. 3, there is shown a linkage by which the two bomb bay doors 7 are moved outwardly to the open position. As can be seen in FIG. 3, the left door 7 pivots about the location 53, and is interconnected to the location 53 by a strut 65. A rod 69 is actuated by the hydraulic actuator 50 to move the arm 66 downwardly to in turn cause the strut 67 to push the door 7 upwardly and outwardly, rotating about the pivot point 73. The right door 70 is connected to an arm 55, the lower end of which connects to the right door 7 and the upper end of which connects at 77 to an actuating linkage connected to the hydraulic actuator 50. When the hydraulic actuator 50 is extended, this moves the upper end of the arm 55 on an arcuate path counterclockwise to open the right door 7.

U.S. Pat. No. 2,658792 (Scott) illustrates a door which is slid from a closed position parallel to the outside contour of the body to a forward position so that it is within the body of the vehicle.

U.S. Pat. No. 2,670,156 (Clark et al.) shows a catapult hook mechanism and FIG. 9 shows the door and the hinge mechanism by which the door 81 is moved. There are two L-shaped strips 86 and 87 pivotally connected at a center location, one being pivotally connected at 90 structure, and the other end at 95 to the door panel. The second member is mounted at 94 at a slot and has a pivot connection 92.

U.S. Pat. No. 2,921,501 (Parot) relates to a system for an aircraft to release a load, such as bombs. FIG. 5 shows a mechanism for opening the two lower doors 2. There is provided a pair of arms which are actuated by the member 7. Each of the doors has two rollers which fit in respective curved tracks 29 and 30 to move the doors out of their closed position, then rotate these upwardly to the position within the fuselage, such as shown in the broken lines at the left of part of FIG. 5.

U.S. Pat. No. 3,174,712 discloses a hold door for an aircraft. This is designed so that the door can have a circular cross sectional configuration to conform to the contour of the fuselage. The door member 6 and 7 are mounted in sideways so that these can move from the closed position in a circular path upwardly along the outside of the fuselage.

U.S. Pat. No. 2,486,721 (Miczinski) shows a closure flap assembly for a lift drive mechanism in an aircraft. There are two flaps 1 and 6. The forward flap is pivotally located at a forward location and is rotated about that pivot location by a link 4 which rotates counterclockwise (see FIGS. 1–3) to move the door from the closed position (FIG. 1) to the open position (FIG. 3). The swing end of the link 4 is connected by the link 5 to a member 14 which connects to the rear flap 6. Movement of the link 5 causes the flap 6 to move linearly in a slot 10, and it is also connected by a link 12 to cause a rotating motion of the flap 6 so that it is located in its open position (FIG. 3) to extend downwardly.

U.S. Pat. No. 3,506,223 (Flemming) discloses an airplane having a lifting drive with two flaps which are moved from a closed position (FIG. 1) through an intermediate position (FIG. 2) into an open position (FIG. 3). The member 5 is attached pivotally to two arms 6 and 7 positioned and configured so that the flap 5 swings downwardly and rotates. The forward flap 4 is fixedly connected by the member 12 to a pivot location. The member 12 and the link 6 are interconnected by a link 13, and are driven by a linear actuator.

U.S. Pat. No. 3,585,757 (Ritchie et al.) discloses a passenger door for an aircraft which is adapted for use in high altitude flights where the cabin is pressurized. To open the door, the door is moved inwardly and upwardly and travels on tracks that have a non-constant curvature and extend upwardly.

U.S. Pat. No. 3,718,171 (Goodwin) shows a door for an aircraft, and more particularly for the cargo hold of the aircraft, where the door is made in two sections pivotally connected to one another. The door is hinge mounted at its upper end, and there are intermediate jacks 26 at the location of the hinge connection for the two door sections to provide limited movement of the two door sections relative to one another when the door moves to its open position.

U.S. Pat. No. 2,457,625 (Amiot) discloses a means for controlling the closing and opening of two lower doors P. The two doors are moved from the closed position (FIG. 1) to an intermediate position where the outer edges of the door are lifted upwardly by the arms 7 moving vertically, and then the arms 7 move circularly about center axis 11 to rotate the doors to the stowed position of FIG. 3 within the fuselage.

U.S. Pat. No. 2,731,221 relates to an aircraft door installation for high speed aircraft, particularly the type from which bombs or other loads are dropped in flight. There are right and left door sections, with each section comprising two door panels pivotally mounted to one another at 14. The outer door section is hinge mounted to the aircraft structure at its upper outer pivot location 13. An arm 15 extends upwardly to a pivot location, and the lower end is pivotally mounted to the inner door. As each door section is moved outwardly and upwardly, the two panels of each section rotate toward one another and in the fully open position the outer door is above the inner door, and both extend laterally outward from the aircraft.

U.S. Pat. No. 5,181,677 (Kaplin et al.) discloses a door assembly for an aircraft where there is a sliding door secured by tracks and is moved laterally between its open and closed position.

It is an object of the present invention to provide an improved landing gear door assemblies having a desirable balance of operating features, and which are particularly adapted to provide proper clearance for the landing gear, maintenance, and tire replacement and repair, while yet maintaining proper effective operation to meet the overall requirements of the aircraft.

SUMMARY OF THE INVENTION

The door assembly of the present invention is arranged to be used in conjunction with the landing gear of an airplane, where the landing gear has a stowed position in the airplane and an operating position. The airplane has a landing gear door opening through which the landing gear travels on a travel path moving between its stowed and operating positions.

There are first and second door assembly sections positioned in side by side relationship. Each door assembly section comprises a panel section which in turn comprises at least one panel which has a closed position extending at least partially across said door opening.

Each assembly section also has a positioning section operatively connected to the panel section to place the panel section in an open position by moving the panel outwardly and upwardly with a rotational component of travel to pass by one of said door opening edge structures to extend at least partially into said door opening and at least partially above said one of the door opening structures, and to be clear of the travel path of the landing gear.

In a preferred form, the positioning section of each door assembly rotates at least partially about a center rotation to provide said rotational component of travel.

Also in the preferred form the positioning section comprises a positioning linkage portion operatively engaging the door section to impart to at least one part of the panel section a radial component of travel superimposed over the rotational component of travel. The panel section has an outer end panel portion and an inner end panel portion. The outer panel end portion is positioned to move into the door opening and at least partially above said one of said door opening edge structures. The outer end portion in the closed position is at a vertical location lower than the center of rotation and in the open position is at an elevation above the center of rotation. The positioning linkage portion is arranged to move at least part of the outer panel portion radially inwardly relative to the center of rotation.

The positioning section is arranged so that a radially inward component of travel is imparted to the outside potion of the panel section at a location which is in an area at approximately at an elevation of the center of rotation about which the panel section moves.

In one embodiment, the panel section comprises an outer panel and an inner panel which are hinge connected to one another. The outer panel moves rotatably about the hinge connection relative to the inner panel at a location where a radially inward component of motion is imparted to the panel section.

Also in a preferred embodiment, the positioning section comprises a main arm which is mounted for rotation about the center of rotation, and the positioning linkage portion is mounted to the main arm so as to be generally rotatable therewith.

In a specific arrangement of the positioning linkage, there is a panel positioning link connected at one end to the outer end portion of the outer panel by a second end to the main arm in a manner to move through a path of travel and response to rotation of the main arm to move the panel positioning link in a generally radially inward direction and then with further rotation of the main arm to move the panel positioning link radially outward. This movement in a preferred form is accomplished by an extension link connected to the main arm and the panel positioning arm.

In a second embodiment of the present invention, the positioning section for each panel section is rotatably mounted about a center of rotation so that each entire positioning structure is arranged to move rotatably around the center of rotation. In the closed position, a center location of each panel section, which is approximately equally distant between outer and inner end portions of each panel section is located so as to be substantially vertically aligned with the center of rotation.

In the preferred configuration in this second embodiment, in the open position the two panel sections are substantially vertically aligned and located within the airplane structure.

The panel section in this second embodiment has a width dimension which is desirably at least as great as a distance from its center of rotation to an outside surface of the panel section. More desirably, the distance from the center of rotation to the outside surface is less than the width dimension of the panel section to minimize space requirements of the door assembly in the open position.

The distance from the center of rotation to an outside edge of the panel section is desirably no greater than one and a quarter times the width dimension of the panel section, and desirably no less than three quarters of the width of the panel section, and in a preferred configuration about the same as or one tenth less than the width of the panel section.

In the method of the present invention, the door assembly is provided as described above. It is operated in a manner so that the panels or panel sections of the door assembly are located in side by side relationship to close the door. Then the panel sections are moved to the open position by moving each panel section outwardly and upwardly with a rotational component of travel to pass by one of said door opening edge structures to extend at least partially into the door opening and at least partially above one of the door opening edge structures so as to be clear of the path of the travel of the landing gear. Other features of the present invention will become apparent from the following detailed description.

BRIEF DESCRIPTION OF THE DRAWINGS

FIG. 1 is a somewhat schematic view looking downwardly on a lower portion of an aircraft fuselage, and showing two side by side landing gear assemblies;

FIG. 2C is a view similar to FIGS. 2A and 2B, showing the landing gear assembly in its fully open position, and with the landing gear lowered;

DESCRIPTION OF THE PREFERRED EMBODIMENTS

Figure 3A:
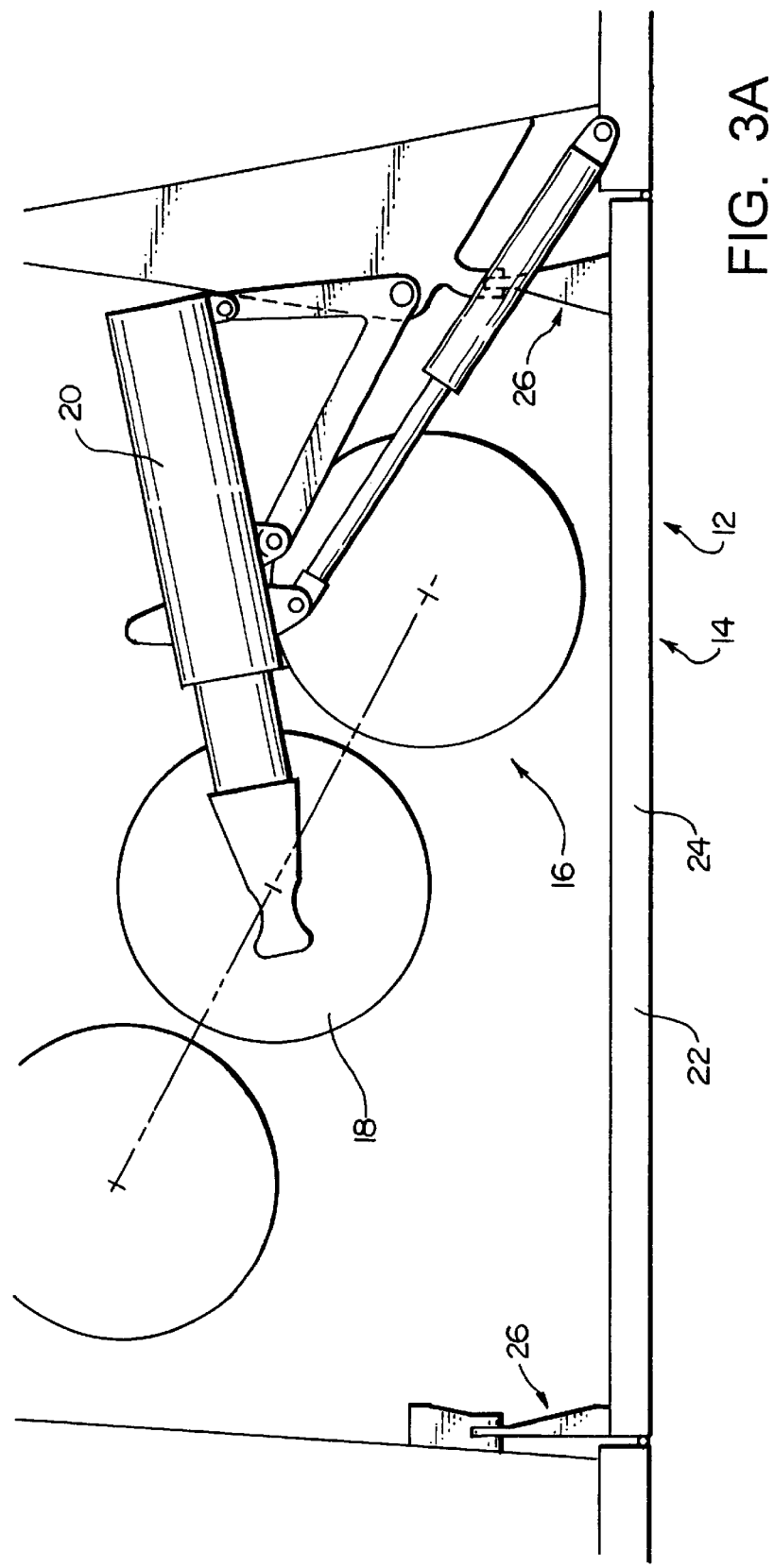
FIG. 3A is a side elevational view showing the landing gear in the stowed position and the door assembly in its closed position.
Figure 3B:
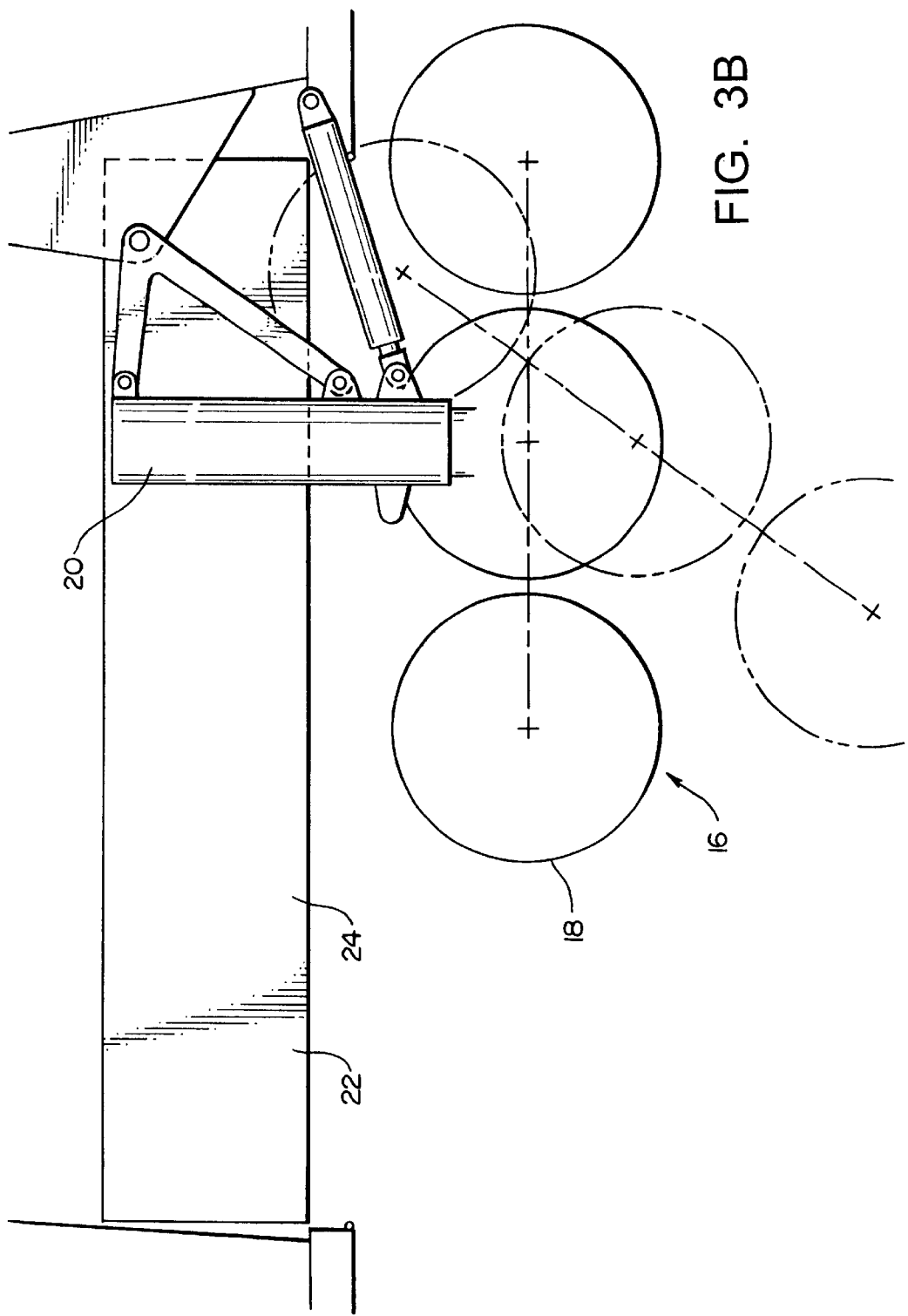
FIG. 3B is a view similar to FIG. 3A, but showing the door assembly in its full open position and the landing gear being deployed.

In FIG. 1, there is shown a lower portion of an aircraft 10 having a longitudinal center axis 11, and showing in top plan view a landing gear section 12 of the aircraft located in the fuselage of the aircraft 10, comprising first and second landing gear assemblies 14, positioned side by side. As can be seen in FIGS. 3A and 3B, each landing gear assembly comprises the landing gear 16 which comprises the wheels 18 and a support and positioning mechanism 20. This landing gear is, or may be, a conventional design, so this will not be described in detail herein. Each landing gear assembly 14 also comprises a door assembly 22. In FIG. 3A, the landing gear 16 is shown in its stowed position, with the door assembly 22 in its closed position, and in FIG. 3B, the landing gear 16 is shown as having been moved to its lower operating position, with the door section 22 in its open position.

Figure 2A:
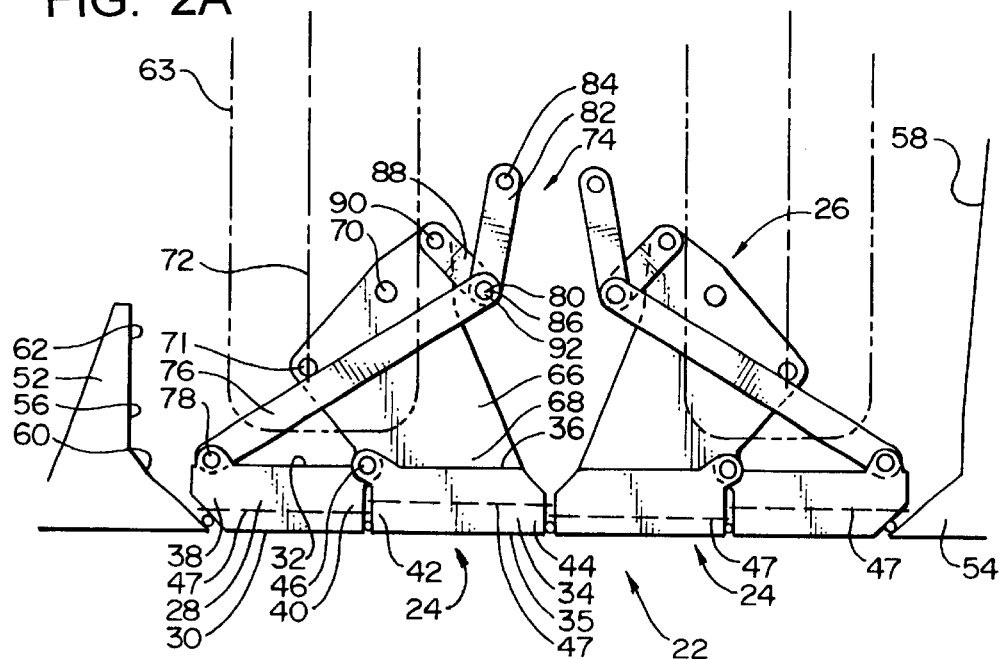
FIG. 2A is a longitudinal sectional view looking at a door assembly for one landing gear, this being in its closed position.
Figure 2B:
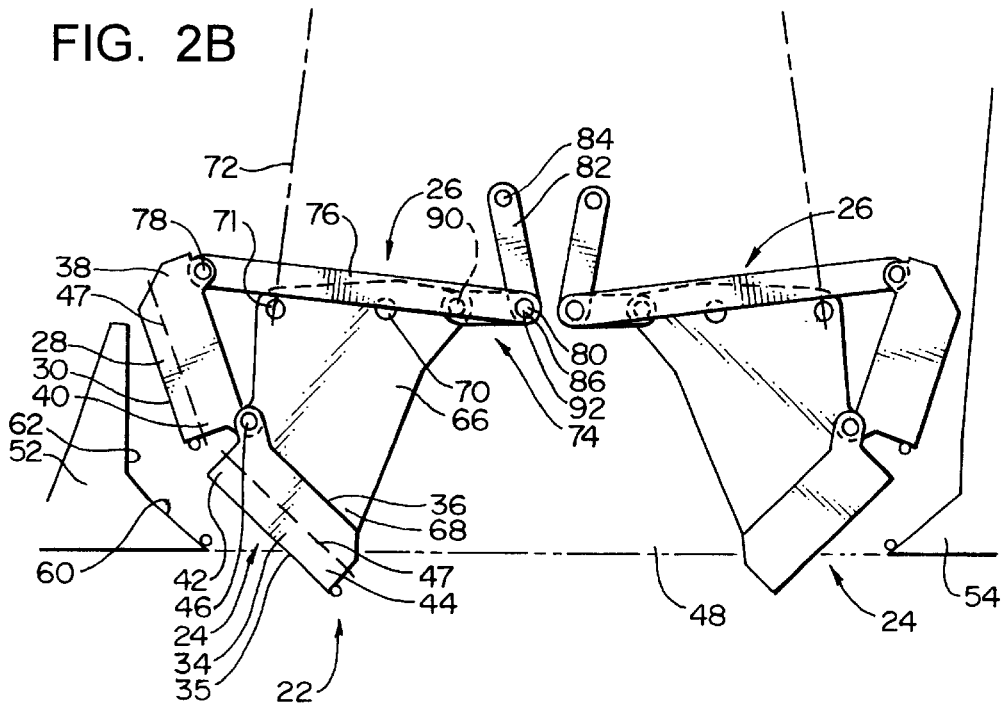
FIG. 2B is a view similar to FIG. 2A, but showing the door assembly in an intermediate position.

Reference is first made to FIGS. 2A, 2B and 2C, showing the first embodiment of the door assembly 22. For purposes of description, the term "inner" or "inward" shall refer to proximity to, or a direction toward, a longitudinal centerline 23 of each door assembly, while the term "outer" or "outward" shall denote the opposite. The term "outside" shall refer to a location outside of the outer surface of the airplane, while the term "inside" shall refer to a location within the outer surface of the airplane structure.

Each door assembly 22 comprises first and second panel sections 24, having first and second positioning mechanisms 26. Each panel section 24 comprises an outside panel 28 having a lower outside surface 30 and an upper inside surface 32, and an inside panel 34 also comprising a lower outside surface 35 and upper inside surface 36. These panel sections 24 extend longitudinally along the landing gear section, and the positioning mechanisms 26 are at opposite ends of the panel sections 24. Since the first and second panel sections 24 are mirror images of one another, but in other respects identical, only the first panel section 24 will be described, this being in the left hand of FIGS. 2A, 2B and 2C. Likewise, since the two positioning mechanism 26 are mirror images of one another, but otherwise identical, only the first positioning mechanism 26 (also in the left hand side of FIGS. 2A, 2B and 2C) will be described in detail, with the understanding that such description refers to the other as well.

The outside panel has an outer portion 38 and an inner portion 40, and the inside panel has an outer panel portion 42 and an inner panel portion 44. The inner edge portion 40 of the outside panel 28 and the outer edge portion 42 of the inside panel 34 are joined at the upper surface at a hinge location 46.

For purposes of description, each panel 28 and 34 shall be considered as having an alignment plane 47 which is parallel to its lower surface 30 or 55. It can be seen that in FIG. 2A, the alignment planes of the panels 28 and 34 of each of the first and second panel sections all are aligned with their alignment planes being in the same plane, so as to close the door opening 48. (For purposes of illustration the alignment planes 47 are slightly offset vertically from one another).

The sides of the doorway opening 48 are defined by two longitudinally aligned edge structures 52 and 54 which are part of the structure of the airplane fuselage. Each of these structures 52 and 54 have interior surfaces, 56 and 58. Each surface 56 or 58 has a lower surface portion 60 which slants upwardly and outwardly and a vertical surface portion 62. These surfaces define at least a portion of the wheel well into which the landing gear is positioned. The tires 63 which pass through the opening 48 are shown in FIGS. 2A and 2C.

The positioning mechanism 26 comprises a main positioning arm 66 which has a lower end portion 68 that is fixedly connected to the upper surface of the inside panel 34. This actuating arm 66 has a fixed pivot connection 70 which is located above (and nearly aligned with) the hinge location 46 in the closed position. The arm 66 also has a drive pivot connection at 71, and there is an actuator shown schematically by the dotted line as a linear actuator 72 which connects to the drive location at 71. In the closed position of FIG. 2A, the drive connection 71 is positioned outwardly and downwardly from the pivot connection 70. The positioning mechanism 26 also comprises a positioning linkage 74. This linkage 74 comprises an outside panel link 76 which has a pivot panel connection at 78 which is at the outer end 38 of the outside panel 28. From the pivot connection 78, in the closed position of FIG. 2A, this link 76 extends inwardly and upwardly to a pivot connecting location 80 which is positioned inwardly from the fixed pivot location 70.

There is a locating link 82 which has a fixed upper pivot location at 84 and a lower pivot connection at 86 which is coincident with the pivot connection 80 of the link 76. Then there is an extension/retraction link 88 which has a pivot connection 90 which in the closed position of FIG. 2A is located inwardly and upwardly of the pivot connection 70. The other pivot connection 92 of the extension link 88 is coincident with the connecting location 80, and 86 of the links 76 and 82, respectively.

To describe the operation of the present invention, reference is now made to FIG. 2A, which shows the door assembly 22 in the closed position, FIG. 2B, which shows the door assembly 22 in the intermediate position, and 2C which shows the door assembly 22 in its fully opened position. As indicated above, since the two panel sections 24 and two positioning section 26 are identical except for being mirror images of one another, only the left panel section 24 and positioning section 26 are described, with the understanding that this applies as well to the others.

Before describing specifically the operation of this first embodiment of the present invention, it is believed that a clearer understanding will be obtained by discussing somewhat conceptually what is occurring in the positioning of the door panels 28 and 34 in moving from the closed position, through the intermediate position, and finally to the fully open position.

In the closed position of FIG. 2A, the panel sections 28 and 34 are laterally aligned with one another and close one half of the door opening 48. The inside panel 34 is fixedly connected to the main positioning arm 66 that rotates about the fixed pivot connection 70. Thus, the rotational movement of the inside panel 34 from the closed position of the FIG. 2A to the open position of the FIG. 2C is a circular movement where both the angular position of the panel 34 relative to the pivot location 70 and also its radial distance from the pivot location 70 are fixed in this circular path.

On the other hand, the outer door 28 follows a path of travel that deviates from this circular travel pattern. More specifically, the inner edge portion 40 is connected at the hinge at 46, and since that point 46 is a fixed point relative to the panel 34, the inner portion 40 of the panel 28 at the hinge 46 does travel in a circular path to the fully opened position.

However, the pivot location 78 at the outer end of the outer panel 28 deviates from a circular path in that when it moves form the closed position of FIG. 2A to the intermediate position of FIG. 2B, its radial distance from the pivot location 70 is shortened. This can be seen in FIG. 2B. Thus, this provides better clearance from the inner vertical surface 50 of the edge structure 52. Also, as can be seen in FIG. 2B, the outer panel 28 has rotated about the hinge connection 46 so that the two panel sections 28 and 34 are not in alignment with one another at the intermediate position.

Then, when the panel section 24 reaches a fully open position, the pivot location 78 of the outer panel 28 has moved further away from the fixed pivot location 70 of the main arm 66 so that the two panels 28 and 34 back in alignment with one another. In the open position of FIG. 2C, it can be seen that the two outside surfaces 30 and 35 of the panels 28 and 34 are parallel with the vertical surface 62 and closely adjacent thereto. Also the inside surfaces 32 and 36 of the panels 28 and 34 are also aligned with one another. Thus, in the position of FIG. 2C, the two panels 28 and 34 provide greater clearance in the wheel well area 94.

Of course, when the door assembly 22 is moved from the open position back to the closed position, this is simply the reverse of the operation described above so that this produces the same clearance benefits.

Let us now turn our attention to the manner in which this is accomplished in this first embodiment.

With reference first to FIG. 2A, showing the door assembly 22 in its closed position, to move the door assembly 22 to its open position, the two linear actuators 72 move the pivot location 71 of each of the main arms 66 in an upward direction. This cause the main arm 66 to rotate about he pivot location 70, and the inner door 34, being fixedly connected to the lower end of the arm 66 rotates in a fixed circular path that initially is in an outward horizontal direction and then moves in its ninety degree curved path to the position of FIG. 2C. It will be noted that the hinge location 46 in the closed position is almost directly below the pivot location 70. Therefore, as the hinge location moves in a ninety degree circular path, it does not become positioned further outwardly when it reaches its open position of FIG. 2C.

Let us now examine the movement of the outer panel 28. The rotational movement of the panel 28 is caused by the force exerted at the pivot location 46 moving the panel 28 outwardly. As this happens, to obtain the movement of the panel 28 as described above, it is necessary for the outside panel link 76 to move the pivot connection location 78 at the outer portion of the panel 28 inwardly. This is accomplished by means of the extension link 88. More specifically, the pivot location 90 rotates inwardly and downwardly to the position of FIG. 2B. AT the same time, the locating link 82, rotating about its pivot connection 84 causes the end location at 92 of the link 88 to move inwardly (i.e. toward a center location). Thus, in the intermediate position of the FIG. 2B, the pivot locations 70, 90 and 92 all come into alignment, with the net result that the link 88 has moved to its furthest inward direction, and since all three links 76, 82 and 88 have a common connection at 80, 86, and 92, the pivot location 78 of the link 76 has moved inwardly.

Then as there is further rotation of the arm 66 from the intermediate position of the FIG. 2B to the fully open position of FIG. 2C, the pivot location 90 now drops below the pivot locations 70 and 80. The effect of this is that in the position of FIG. 2C, the distance between the pivot location 70 and the common pivot location 80, 86 and 92 is shortened to cause the pivot location 78 of the outer panel 28 to move further away from the pivot location 80, 86 and 92.

The overall effect of this operation of the positioning linkage 74 is that the circular path of travel of the connecting location 80 of the link 76 and the path of travel of the common point 80, 86 and 92 match one another so that the overall vertical path traveled by the pivot location 78 at the outer end of the outer panel 28 is, in traveling from the closed position of the FIG. 2A to the open position of FIG. 2C, very close to a vertical straight line path. As indicated above, this has the dual benefit of providing a clearance relative to the side wall 62, and also a clearance with regard to the relative to the landing gear well 94.

It is to be understood that various modifications could be made to the first embodiment without departing from the basic teachings thereof. The particular positioning linkage 74 which is disclosed herein could have certain functions and components substituted for those specifically described herein accomplished by somewhat modified or different linkage and positioning systems, within the broader scope of the present invention, the broader claims of the present invention should be interpreted to cover these.

Figure 4A:
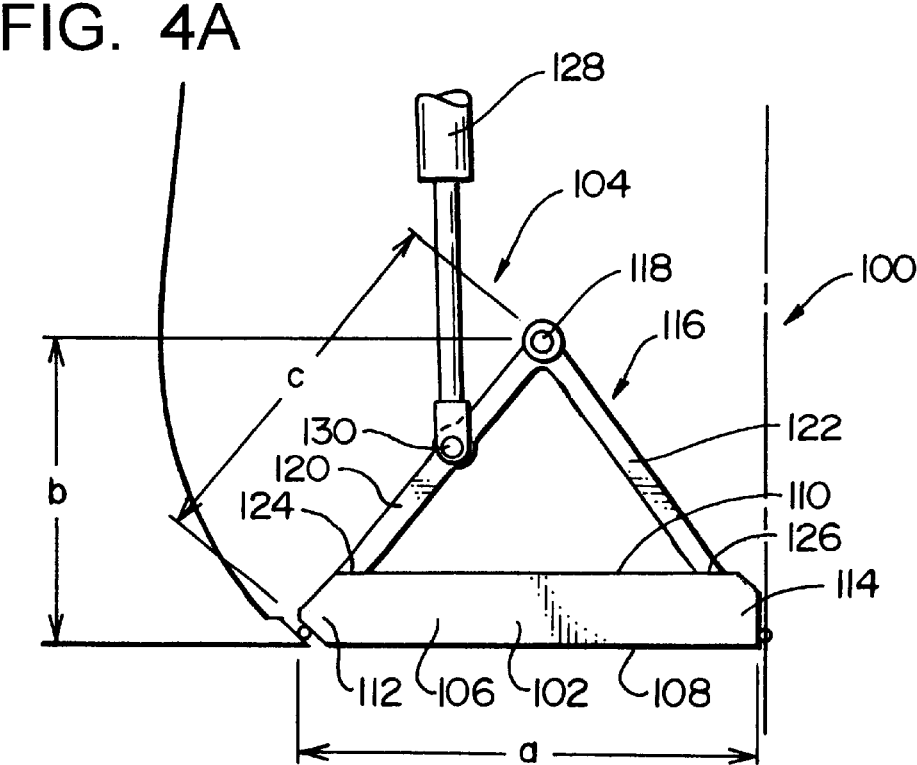
FIG. 4A is a view of one side of a landing gear door assembly showing one door on one side of the door assembly in its closed position.
Figure 4B:
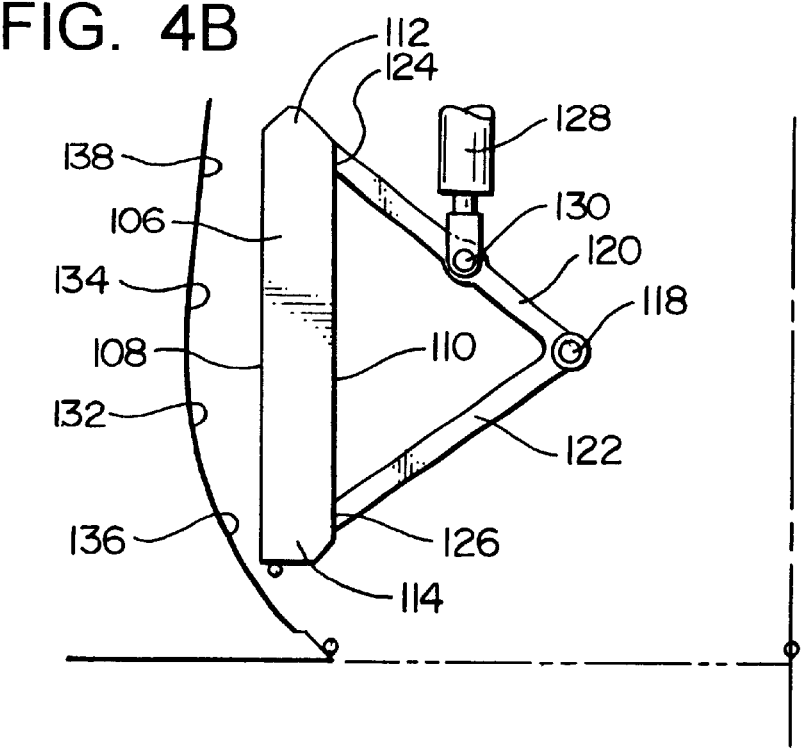
FIG. 4B is a view similar to 4A, but showing the door in its fully open position.

A second embodiment of the present invention is illustrated in FIGS. 4A and 4B. this second embodiment is in large part similar to the first embodiment shown in FIGS. 2A–2C, in that there are two side by side door sections which have a generally horizontal closed position, and each of these moves about a center axis of rotation through about a ninety degree arc of travel to the open position. However, instead of having each door section made in two parts with a hinge connection, there is a single substantially rigid panel. Also, the linkage is simplified.

In describing this second embodiment, only the left half of the door assembly is shown (as seen in FIG. 4A and 4B), with the understanding that there is a substantially identical door assembly section immediately adjacent on the opposite side of the reference center line of the door assembly, with the second door section being a mirror image of the first.

Thus, the door assembly 100, comprises two door assembly sections, with only the left one being shown in FIG. 4A. There is a panel section 102 and a positioning section 104. The panel section 102 is a substantially rigid panel section, and this comprises only a single rigid panel 106 having a lower outside substantially planar surface 108 and an upper inside surface 110. The panel 306 has an outer edge portion 112 and an inside edge portion 114.

The positioning section 104 first comprises a single structurally rigid positioning structure 116 that rotates about a fixed pivot location 118 that is positioned above the panel 106 and is aligned with an approximate center location of the panel 106. This rigid positioning structure 116 comprises an outer arm 120 and an inner arm 122, both of which connect at the upper ends to the pivot location 118. The two arms 120 and 122 diverge downwadly and outwardly from the pivot location 118, so that the lower end of the arm 120 joins to the outer end portion 112 of the panel 106 at a connecting location 124, while the inner arm 122 connects to the inner end portion 114 of the panel 106 at a connecting location 126. In the configuration shown herein, the two arms 120 and 122 establish with the panel 106 an isosceles triangle.

There is a linear actuator 128 that is connected at a pivot location 130 on the arm 120 a moderate distance downwardly from the upward fixed pivot location 118. In the position of FIG. 4A, the linear actuator 128 is extended.

It can be seen that as in the first embodiment, there is an airplane structure 132, having an inwardly facing surface 134 that surrounds the operating area of the landing gear assembly. This surface 134 is adjacent to panel 106 in the open position. It can be seen that the surface 134 comprises a lower surface portion at 136 and an upward vertical surface portion at 138. The lower curved section 136 is contoured to provide adequate clearance to the end portions 112 and 114 of the panel 106, and the vertical surface 138 is aligned to extend generally vertically from the upper end of the curved surface portion 136.

In FIG. 4A, three dimensions are illustrated. First, there is the width dimension of the panel section 106 indicated at "a", second the dimension from the center of rotation 118 to the outside surface 108 of the panel section 102, indicated at "b", and a third dimension from the center of rotation 118 to the outside edge of the panel section 106, indicated at "c".

In the preferred form, the distance "b" should be no greater than the distance "a", and desirably no greater than about three-quarters of the distance "a". The dimension "c" should be no greater than one and a quarter greater than the distance "a", and desirably should be nearly the same dimension as dimension "a", or no greater than ten to twenty percent less.

To describe the operation of the present invention, in the closed position, the two panels 106 (only one of which is shown in FIGS. 4A and 4B) are positioned adjacent to one another in side by side relationship, and also aligned with one another. When the door panels 106 are moved to the open position, the linear actuator 128 is retracted to act on the arm 120 which in turn moves the entire rigid structure (comprising the arms 120 and 122 and also the panel 106 upwardly through a ninety degree travel to the open position of the FIG. 4B.

It is to be understood that various modifications could be made without departing from the basic teachings of the present invention.

Therefore I claim:

1. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:

a) first and second door assembly sections positioned in side by side relationship;
  b) each door assembly section comprising a panel section comprising an outer panel and an inner panel which have a closed position extending at least partially across said door opening;
  c) each assembly section having a positioning section operatively connected to said panel section to place said panel section in an open position by moving said panel section outwardly and upwardly with a rotational component of travel to pass by one of said of door opening edge structures to extend at least partially into said door opening and at least partially above said one of said door opening edge structures, and to be clear of the travel path of the landing gear;
  d) said outer panel and said inner panel being hinge-connected to one another, with said outer panel moving rotatably about said hinge connection relative to said inner panel radial in movement between thee closed position and the open position.

2. The door assembly as recited in claim 1, wherein said positioning section of each door assembly operates at least partially about a center of rotation to provide said rotational component of travel.

3. The door assembly as recited in claim 2, wherein each positioning section comprises a positioning linkage portion operatively engaging said door section to impart to at least one part of the panel section a radial component of travel superimposed over the rotational component of travel.

4. The door assembly as recited in claim 3, wherein said panel section has an outer end panel portion and an inner end panel portion, said outer panel end portion being positioned to move into said door opening and at least partially above said one of said door opening edge structures, said outer end portion in the closed position being at a vertical location lower than said center of rotation, and in the open position being in an elevation above said center of rotation, said positioning linkage portion being arranged to move at least part of said outer panel portion radially inwardly relative to said center of rotation.

5. The door assembly as recited in claim 4, wherein said positioning section is arranged so that a radially inward component of travel is imparted to the outside portion of the panel section at a location which is in an area at approximately an elevation of the center of rotation.

6. The door assembly as recited in claim 3, wherein said positioning section comprises a main arm which is mounted for rotation about said center of rotation, and said positioning linkage portion is mounted to said main arm so as to be generally rotatable therewith, and said positioning linkage portion is arranged to impart said radially inward component of travel as said main arm rotates.

7. The door assembly as recited in claim 3, wherein said panel section has an outer end panel portion and an inner end panel portion, said outer panel end portion being positioned to move into said door opening and at least partially above said one of said door opening edge structures, said outer end portion in the closed position being at a vertical location lower than said center of rotation, and in the open position being in an elevation above said center of rotation, said positioning linkage portion being arranged to move at least part of said outer panel portion radially inwardly relative to said center of rotation.

8. The door assembly as recited in claim 4, wherein said positioning section is arranged so that a radially inward component of travel is imparted to the outside portion of the panel section at a location which is in an area at approximately an elevation of the center of rotation.

9. The door assembly as recited in claim 1, wherein said position section is arranged so that a radially inward component of travel is imparted to the outside portion of the panel section at least in part at a location which is in an area at approximately an elevation of a center of rotation about which said panel section moves at least in part rotatably.

10. The door assembly as recited in claim 1, wherein each door assembly section and its related positioning section are arranged so that the panel section in moving between the closed position and the opened position moves through an intermediate position between the closed position and the opened position, and in moving from one of the closed position and open position to the intermediate position, the inner and outer panels rotate to a greater degree relative to one another, and in moving from the intermediate position toward the other of the closed position or open position rotate in the other direction so that the inner and outer panels are closer to being in alignment to one another.

11. The door assembly as recited in claim 10, wherein said positioning section comprises a positioning arm having one end portion connected to the inner panel and a second portion mounted to a pivotal location about which the positioning arm rotates, and a positioning member connected to the positioning arm and to the outer panel, said positioning section being arranged so that as the panel section moves from the closed position toward the intermediate position, said positioning member moves an outer end portion of the outer panel toward a center of rotation of said positioning arm, and moves the outer end portion of the outer panel further from the center of rotation when moving from the intermediate position to the open position.

12. The door assembly as recited in claim 11, wherein said positioning member connects to said positioning arm through a positioning link which is responsive to rotational movement of said positioning arm in a manner that the positioning member moves in a direction so that its connection to the outer end of the outer panel is toward the center of rotation of the positioning arm when the pane section is moving toward the intermediate position.

13. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
   a) first and second door assembly sections positioned in side by side relationship;
   b) each door assembly section comprising a panel section comprising at least one panel which has a closed position extending at least partially across said door opening;
   c) each assembly section having a positioning section operatively connected to said panel section to place said panel section in an open position by moving said panel section outwardly and upwardly with a rotational component of travel to pass by one of said of door opening edge structures to extend at least partially into said door opening and at least partially above said one of said door opening edge structures, and to be clear of the travel path of the landing gear;
   d) each positioning section being arranged so that a radially inward component of travel is imparted to the outside portion of the panel section at a location which is in an area at approximately an elevation of a center of rotation about which said panel section moves at least in part rotatably, and each panel section at the closed position has a center location which is approximately equally distant between outer and inner end portions, and said center of rotation is substantially vertically aligned with the center location of the flap section.

14. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
   a) first and second door assembly sections positioned in side by side relationship;
   b) each door assembly section comprising a panel section comprising at least one panel which has a closed position extending at least partially across said door opening;
   c) each assembly section having a positioning section operatively connected to said panel section to place said panel section in an open position by moving said panel section outwardly and upwardly with a rotational component of travel to pass by one of said of door opening edge structures to extend at least partially into said door opening and at least partially above said one of said door opening edge structures, and to be clear of the travel path of the landing gear;
   d) each positioning section comprising a positioning structure which is rotatably mounted about a center of rotation, and each positioning structure is arranged to move rotatably around said center of rotation to cause substantially the entire panel section to move in a circular path around a fixed center of rotation;
   e) each panel section having a width dimension and a lower outside surface, said width dimension being at least as great as a dimension from the center of rotation to the lower surface of the panel section, whereby in the stowed position, lateral spacing from the center of rotation to the panel outer surface is maintained at a desired limit.

15. The assembly as recited in claim 14, wherein the distance from the center of rotation to the outside surface of the panel section is less than the width dimension of the panel section.

16. The assembly as recited in claim 15, wherein the dimension from the center of rotation to the lower surface of the panel section is no greater than three quarters of the width dimension.

17. The assembly as recited in claim 16, wherein the lower surface of the panel section is a substantially planar surface.

18. The assembly as recited in claim 12, wherein the lower surface of the panel section is a substantially planar surface.

19. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:
   a) first and second door assembly sections positioned in side by side relationship;
   b) each door assembly section comprising a panel section comprising at least one panel which has a closed position extending at least partially across said door opening;
   c) each assembly section having a positioning section operatively connected to said panel section to place said panel section in an open position by moving said panel section outwardly and upwardly with a rotational component of travel to pass by one of said of door opening edge structures to extend at least partially into said door opening and at least partially above said one of said door opening edge structures, and to be clear of the travel path of the landing gear;

d) each positioning section comprising a positioning structure which is rotatably mounted about a center of rotation, and each positioning structure is arranged to move rotatably around said center of rotation to cause substantially the entire panel section to move in a circular path around a fixed center of rotation, a distance from the center of rotation to an outside edge of its related panel section being no greater than about one and a quarter times a width dimension of the panel section.

20. The door assembly as recited in claim 19, wherein the distance from the center of rotation to an outside edge of its related panel section is no less than about three quarters of a width dimension of the panel section.

21. A landing gear door assembly for a landing gear of an airplane, where the landing gear has a stowed position in the airplane and an operating position, said airplane having a landing gear door opening which is defined at least in part by first and second door opening edge structures, and through which the landing gear travels on a travel path moving between its stowed and operating positions, said door assembly comprising:

a) first and second door assembly sections positioned in side by side relationship;

b) each door assembly section comprising a panel section comprising at least one panel which has a closed position extending at least partially across said door opening;

c) each assembly section having a positioning section operatively connected to said panel section to place said panel section in an open position by moving said panel section outwardly and upwardly with a rotational component of travel to pass by one of said of door opening edge structures to extend at least partially into said door opening and at least partially above said one of said door opening edge structures, and to be clear of the travel path of the landing gear;

d) said positioning section comprising a positioning arm having a lower end connected to an inner end portion of its panel section, and an upper end at a pivot location, and a positioning member having one end connected to an outer end portion of the panel section and a second end operatively connected to said positioning arm at a location spaced from said pivot location of the positioning arm, said positioning arm and said positioning member being interconnected in a manner that with the panel section moving from the closed position toward the open position, the second end of the positioning member is caused to move in a direction so that the first end of the positioning member moves toward the pivot location of the mounting arm.

22. The door assembly as recited in claim 21, wherein each door assembly section and its related positioning section are arranged so that the panel section in moving between the closed position and the open position moves through an intermediate position between the closed position and the open position, and in moving from one of the closed position and open position to the intermediate position, the outer end of the panel section moves toward the center of rotation, and in moving from the intermediate position toward the other of the closed position or open position the outer end of the panel section moves further from the center of rotation.

23. The door assembly as recited in claim 21, wherein said positioning member connects to said positioning arm through a positioning link which is responsive to rotational movement of said positioning arm in a manner that the positioning member moves in a direction so that its connection to the outer end of the outer panel is toward the center of rotation of the positioning arm when the panel section is moving toward the intermediate position.

* * * * *